INVENTOR.
WILLIAM F. HUCK

Aug. 27, 1957
W. F. HUCK
2,804,189
MACHINE FOR SEVERING AND TRIMMING
PAPER PRODUCTS AND THE LIKE
Filed July 8, 1953
6 Sheets-Sheet 2
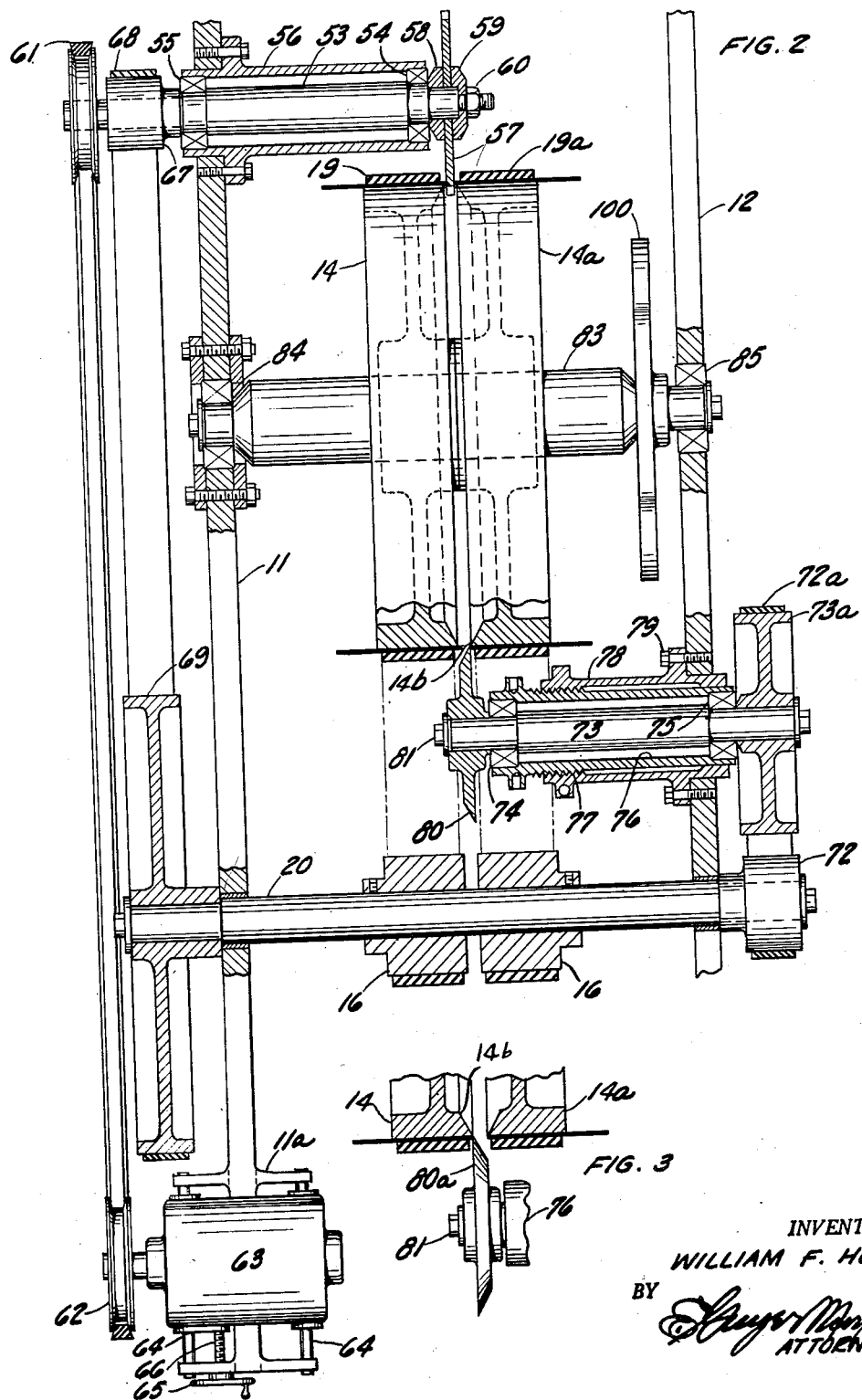
INVENTOR.
WILLIAM F. HUCK
BY
ATTORNEY Aug. 27, 1957 W. F. HUCK 2,804,189
MACHINE FOR SEVERING AND TRIMMING
PAPER PRODUCTS AND THE LIKE
Filed July 8, 1953 6 Sheets-Sheet 4

INVENTOR.
WILLIAM F. HUCK
BY
ATTORNEY

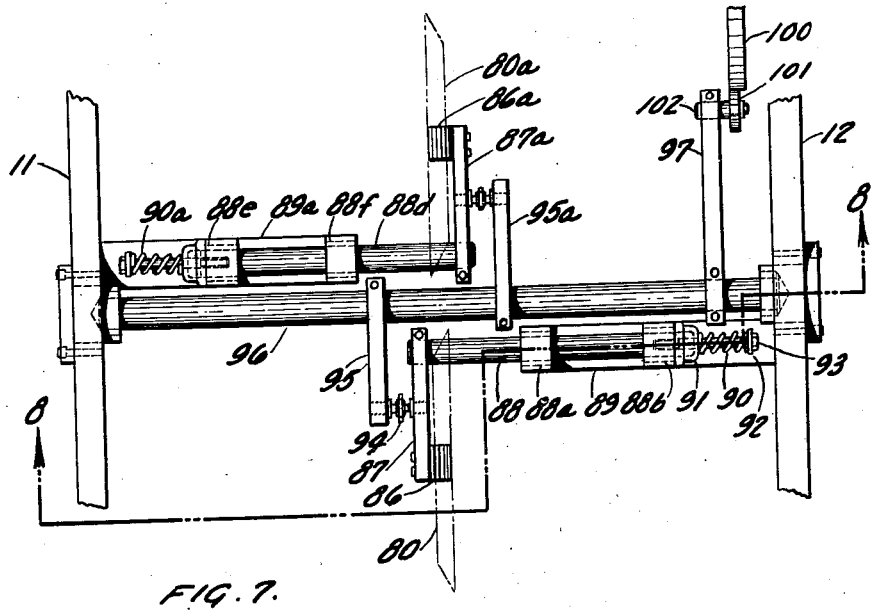

INVENTOR.
WILLIAM F. HUCK

United States Patent Office 2,804,189
Patented Aug. 27, 1957

2,804,189

MACHINE FOR SEVERING AND TRIMMING PAPER PRODUCTS AND THE LIKE

William F. Huck, Forest Hills, N. Y.

Application July 8, 1953, Serial No. 366,656

4 Claims. (Cl. 198—21)

This invention relates in general to means for severing paper products and more particularly to a machine adapted to quickly and accurately cut a paper product into two equal parts.

An object of the invention is to provide a machine of the kind indicated and of a design and construction adapted to receive paper products from a conveyor and then automatically register them in position for immediate cutting and discharge to a second conveyor.

Another object is to provide a machine having improved means for initially squaring and registering a paper product before delivering it to a coacting cutting mechanism as an unbroken sequential operation.

Another object is the provision of a machine adapted to feed and cut folded paper products by means of rotary mechanism thus eliminating the customary reciprocating cutting knives.

Another object is to provide novel and efficient mechanism for use in the printing and paper products industries in order to effect a substantial saving of time in cutting the various products to predetermined sizes.

A further object is to provide a device that will effectively square and register paper products before clamping them preparatory to their cutting.

A still further object is to produce a device of the kind indicated that may be used for trimming the edges of paper products in addition to its usual function of cutting the said products in half.

An additional object is the provision of generally improved mechanism in a machine of the kind indicated so that the device will be practical, serviceable in use and of a rugged construction affording long life and dependable use.

In the paper products and printing industries, there is a constant need for cutting or trimming the edges of paper products. In the book and magazine industry, in particular, these products, with a view to saving time, are usually produced "two up" or in tandem style; i. e., one page above the other. The products processed in this manner for economy of paper, are customarily divided into two parts.

According to this invention, a continuously operating rotating cutter is employed in combination with automatically squaring and registering mechanism that assures the accurate presentation of the paper products to the cutting means, so that uniformity of size and contour may be maintained during the entire processing.

The paper products handled by this device are received from an adjacent conveyor and then thrust into contact with rotary abutment members that are effective to momentarily align or register the said products as they feed forward into mechanism that, after their registration, clamps them in preparation for their cutting by a rotary cutter.

The continuous feeding, registering, cutting and delivering action proceeds in an unbroken sequence that effects a substantial saving of time ordinarily expended in the functioning of conventional mechanism having reciprocating cutting and/or registering means.

Additional objects and advantages residing in the novel design and construction will appear as the description proceeds and will be best understood when taken in connection with the accompanying drawings wherein:

Figure 2 is a fragmentary sectional view, taken on line 2—2 of Figure 1 and as seen in the direction of the arrows;

Figure 3 is a fragmentary sectional detail view, taken on line 3—3 of Figure 1, looking in the direction of the arrows, and showing one of the rotary cutters operatively applied to a product.

Figure 7 is a plan view, taken on line 7—7 of Figure 5, looking in the direction of the arrows;

Figure 8 is a fragmentary elevational view, taken on line 8—8 of Figure 7;

Figure 1:
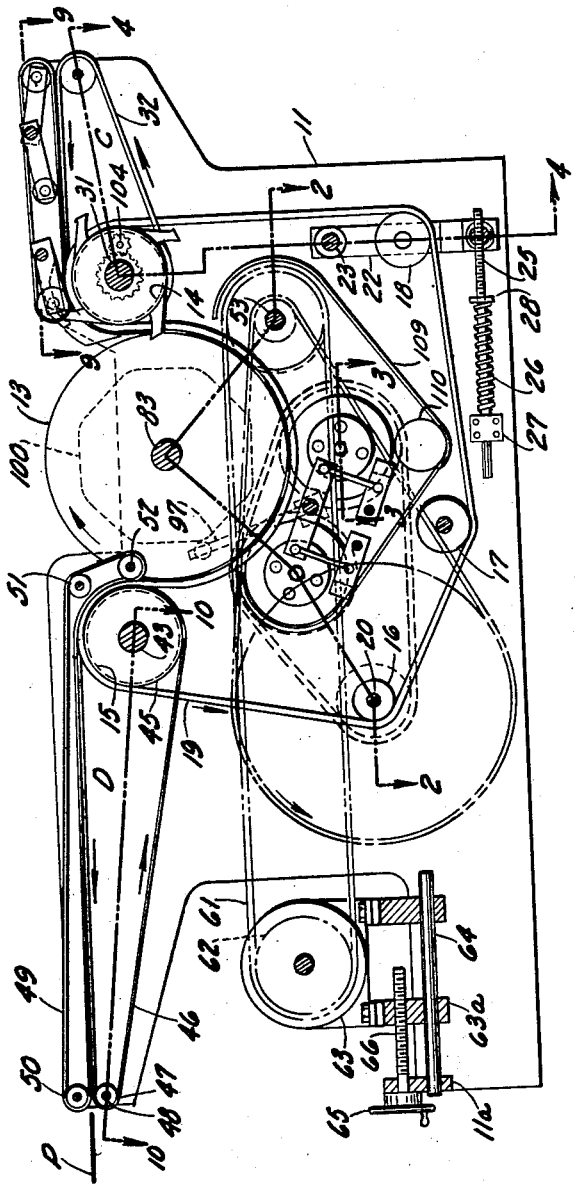
Figure 1 is a side elevational view, partly in section, of a machine embodying the invention, with one of the side frames and certain other parts removed for clarity of illustration.

Referring now to the drawings wherein similar characters of reference indicate corresponding parts in the several views of the preferred form of the invention, 11 and 12 designate generally side frames arranged in opposed parallel relation and serving as the principal support of the other components hereinafter described.

Rotatably arranged between the side frames 11 and 12 is a drum 13 and a plurality of pairs of pulleys 14, 15, 16, 17 and 18 that operably receive a pair of comparatively heavy belts 19, 19a driven by a pair of the above-mentioned pulleys 16 that are fast to a driven shaft 20. The direction of travel of the belts 19, 19a is indicated by an arrow thereon, and is such as to communicate a clockwise rotation to the drum 13, as denoted by an arrow on the latter.

Considerable tension is applied to the belts 19, 19a by the pulleys 18, 18a, the latter being mounted on stud shafts 21, 21a carried on arms 22, 22a rotatably supported on shafts 23, 23a. The lower end of each of the arms 22, 22a carries a block or nut 24, 24a respectively engaged on threaded spindles 25, 25a. These spindles are individually encircled by a coil spring, as at 26, having one end in abutment with a block or bracket, as at 27, and wherein the respective adjacent spindle 25 or 25a is slidably supported. The other end of each coil spring 26 is in contact with a washer, as at 28, adjustably fastened in desired positions on the respective spindles 25, 25a. As best shown in Figure 1, it will be noted that spring 26 is compressed between block 27 and washer 28, thereby communicating a longitudinal thrust to the spindle 25 that in turn tends to rotate arm 22 in a counter-clockwise direction.

Figure 4:
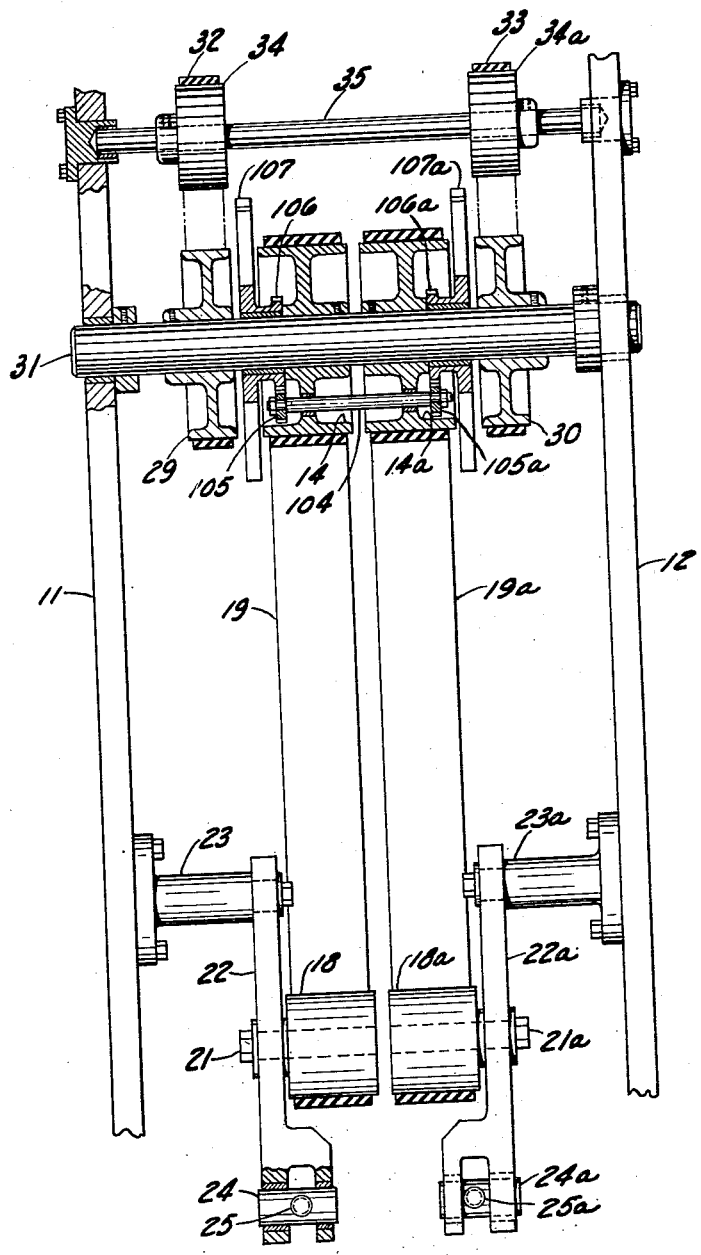
Figure 4 is a fragmentary section view, taken on line 4—4 of Figure 1, and as seen in the direction of the arrows.

The pulleys 14, 14a, as best shown in Figure 4, are arranged beside pulleys 29, 30 and, similarly to the latter, are fixed to shaft 31 which is rotatably supported between the frames 11 and 12. The pulleys 29, 30 carry belts 32, 33 respectively, extending around pulleys 34, 34a mounted on shaft 35 which is rotatably mounted between the above-mentioned frames.

Figure 9:
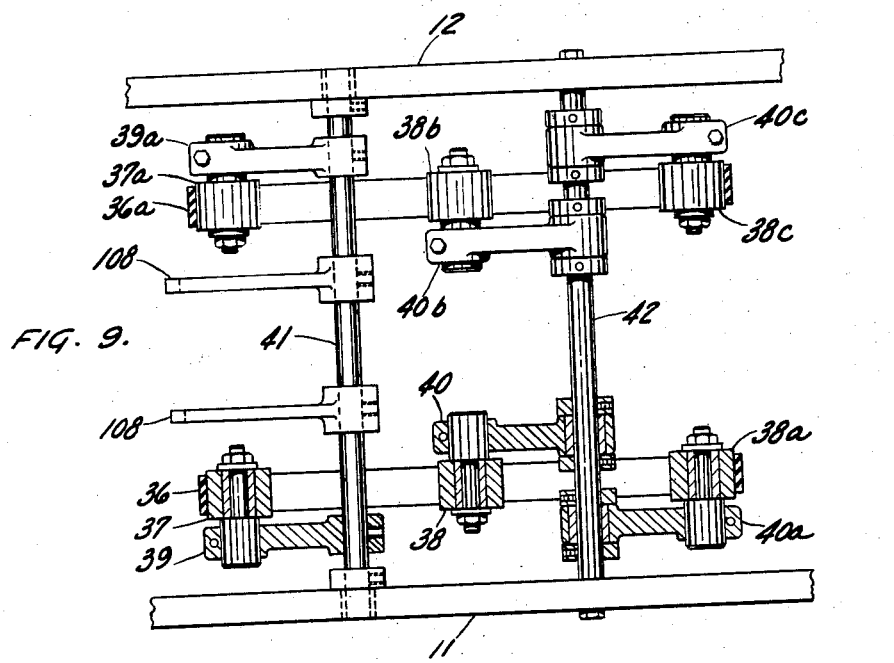
Figure 9 is a longitudinal sectional view, taken on line 9—9 of Figure 1.
Figure 10:
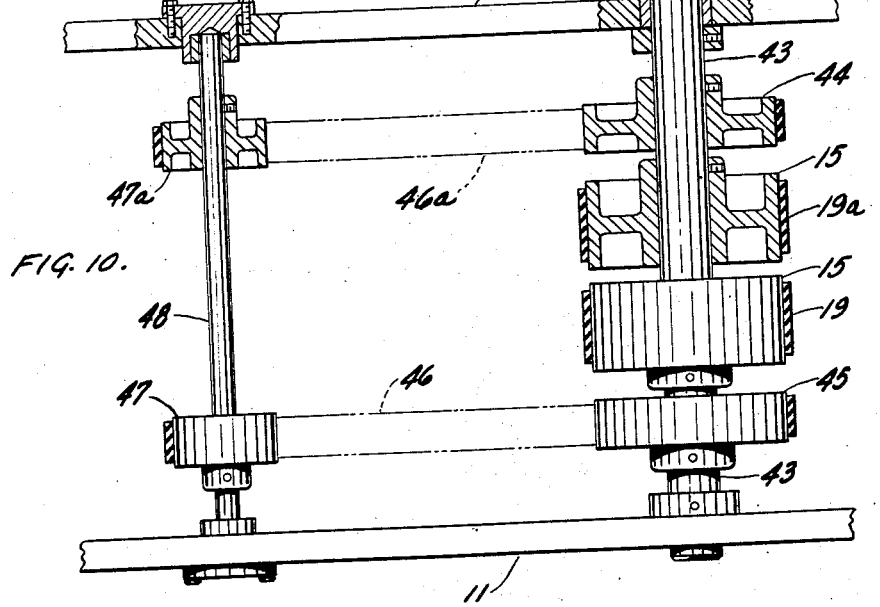
Figure 10 is a longitudinal sectional view, taken on line 10—10 of Figure 1.

The belts 32, 33 form the lower part of a dual type conveyor, designated generally at "C" (Fig. 6), the upper portion of which is formed by belts 36, 36a that engage pulleys 37, 37a, 38, 38a and 38b, 38c freely rotatable on arms 39, 39a, 40, 40a, and 40b, 40c. As best shown in Figure 9, the arms 39, 39a that carry pulleys 37, 37a respectively, are fast to a rock shaft 41 turnably mounted in the side frames 11, 12; while the arms 40, 40a, 40b and 40c carrying pulleys 38, 38a, 38b and 38c are rotatably supported on a shaft 42 secured to the same side frames 11, 12. In a similar fashion, alongside of pulley 15 and mounted on shaft 43, are pulleys 44, 45 accommodating belts 46, 46a extending to the left over pulleys 47, 47a on shaft 48. The belts 46, 46a form the lower part of a two belt conveyor designated generally at "D" whose upper belt 49 passes over pulleys 50, 51 and 52.

Adjacent the lower right hand side of the drum 13 is a shaft 53 that extends to the frame 11 and is supported in bearings 54, 55 arranged on a sleeve 56 bolted to the said frame. The shaft 53 has secured thereto, a circular saw 57 that is clamped thereon between two washers 58, 59 and by a nut 60. The shaft 53 is driven by a belt 61 via a pulley 62 connected to the shaft of a variable speed motor 63 that is slidably mounted on bars 64 connected to frame 11 and adjustable thereon by means of a hand wheel 65 secured to a screw 66 threadedly engaged in extensions 63a of the base of the said motor, and turnably supported against axial movement in an extended portion 11a of the frame 11.

A second pulley 67 on shaft 53 carries a belt 68 passing around a pulley 69 at the left hand of shaft 20. The shaft 20 also has a pulley 72 at its right hand end and opposite the pulley 69 at its left hand end (Fig. 2).

A shaft 73 having a pulley 73a is operatively connected to driven shaft 20 by a belt 72a in engagement with the pulley 72 on shaft 20 and with the aforesaid pulley 73a. The shaft 73 is turnably supported on bearings 74, 75 retained in an inner sleeve 76 that is threadedly engaged, as at 77, in an outer sleeve 78 fastened, as by screw bolts 79, to the frame 12. A rotary cutter 80 is secured to the inner end of shaft 73 by a screw and washer, as at 81. Axial adjustment and accurate positioning of the shaft 73 and consequently of the cutter 80, may be effected by rotation of the sleeve 76 which is effected by applying a suitable tool to the projecting lugs thereon.

As illustrated in Figure 2, it will be observed that the outer periphery of the cutter 80 is adapted to coact with cutting edges or surfaces, as at 14b, on the pulley 14a on shaft 83 which is rotatably supported in bearing 85 on the frame 12. The cutter 80 is maintained sharp by engagement with an abrasive stone 86 (Figures 5 and 7) fastened to an arm 78 clamped to a shaft 88 supported in bearings 88a, 88b arranged in a bracket 89 bolted to the frame 12. The right hand end of shaft 88 has a spring 90 abutting a washer 91 in contact with bracket 89.

Figure 5:
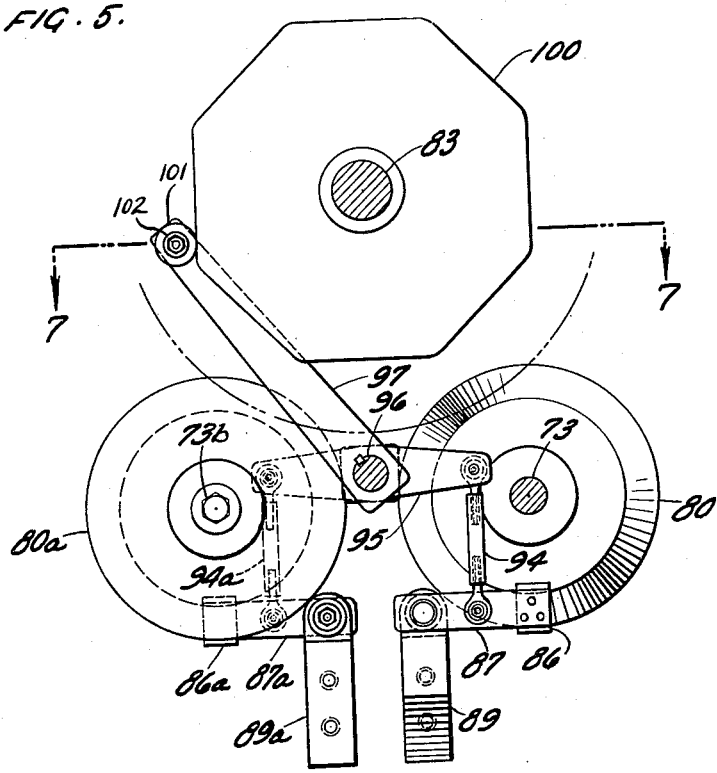
Figure 5 is an enlarged side elevational view showing the rotary trimming knives and the means for sharpening them.

The outer end of the spring 90 is engaged against a second washer 92 retained by a bolt 93 which is threaded into the end of the shaft 88. The axial thrust imparted by spring 90 to the shaft 88, it will be noted, serves to resiliently maintain the sharpening stone 86 against the edge of the cutter 80. The arm 87 is reciprocated by a link 94 connected at one end thereto, the other end of link 94 being hinged to one end of an arm 95 on a rock shaft 96. Another cutter 80a similar to the cutter 80 and having corresponding functions, is secured to the extended end of a shaft 73b operatively connected to the driven shaft 20 and rotatably supported in an adjustable bearing assembly (not shown) attached to the frame 11. The last-mentioned assembly is substantially similar to the bearing assembly supporting the cutter 80, and it will therefore be understood that the description of the latter assembly is applicable to the assembly carrying the cutter 80a. The cutter 80a is sharpened by a stone 86a fast to an arm 87a on a shaft 88d supported in bearings 88e, 88f arranged in a bracket 89a on the frame 11. The left hand end of the shaft 88d is engaged by a spring 90a performing the same functions as spring 90. As best shown in Figure 5, the arm 87a is hingedly connected to a link 94a pivotally connected to an adjacent end of the arm 95 on rock shaft 96.

The shaft 96 is oscillated by an arm 97 clamped thereto, oscillation of the said arm 97 being effected by a cam 100 in engagement with a cam roller 101 rotatable on a stud 102 in the said arm. Since cam 100 is mounted on shaft 83 (Figure 2), it will rotate through the intermediary of belts 19, 19a, and its configuration is such as to impart an oscillatory motion to shaft 96 and, via the links 97, 95, 94 and 87, alternately to the sharpening stone 86 that engages the cutter 80 and to the stone 86a engaging the cutter 80a.

As best shown in Figure 4, it will be noted that the pulleys 14, 14a mentioned above, are mounted on a shaft 31 rotatably arranged in the frames 11 and 12, the said pulleys carrying an eccentrically positioned shaft 104 having spur gears 105, 105a that extend beyond the ends of the said pulleys 14, 14a and engage gears 106, 106a that form a part of the hub portion of star wheels or rotary stops 107, 107a which are freely rotatable on shaft 31. It will be observed that while the star wheels 107, 107a are free to rotate independently of the pulleys 14, 14a, they are maintained in fixed relation or alignment through the intermediary of the spur gears 105, 105a that are fast to the eccentric shaft 104.

Figure 6:
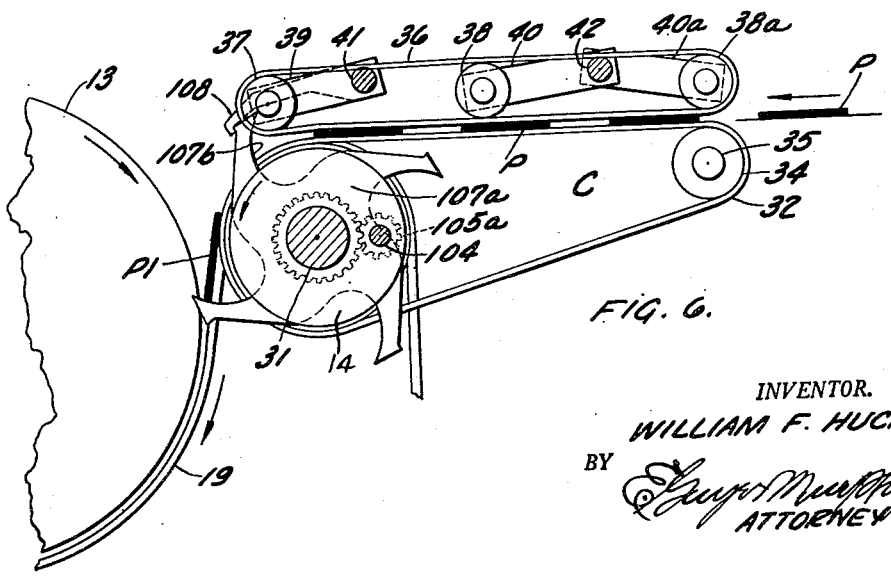
Figure 6 is a fragmentary enlarged side elevational view of the feeding conveyor and the rotary registering mechanism.

In Figure 6, it will be seen that a product "P" that, for example, may be paper, is being conveyed in a direction from right to left and will be accurately aligned as it rotates around pulleys 14, 14a on its way and preparatory to being engaged between drum 13 and belts 19, 19a, it is held momentarily stationary by the concave blades 107b of the star wheels or rotary stops 107, 107a, which serve as means to align or register paper products, one at a time, preparatory to their severing and trimming by the saw 57 and cutters 80, 80a.

The star wheels 107, 107a are retained against movement by a pair of latches or dogs 108, 108a fast to rock shaft 41. These latches are raised in normal operation by a product "P" approaching the pulleys 37, 37a and, thrusting between the latter and the belt-encircled pulleys 14, 14a, raising the pulleys 37, 37a and their supporting arms 39, 39a thereby swinging upwardly the latches 108, 108a. This angular movement of the latches 108, 108a releases the star wheels 107, 107a on the shaft 31 for counterclockwise rotation to a degree sufficient to pass the product immediately engaged and permit a succeeding product to engage the next curved blade 107b of the adjacent star wheels 107, 107a and then be similarly released for subsequent processing by the machine.

The function and general mode of operation of the device has been in part indicated above, but may be summarized as follows:

Assuming a product "P" is located between the belts of the conveyor "C" after entering between these belts from the right-hand side, as viewed in Figure 6, and has travelled until it approaches arm 107b of the star wheels 107, 107a, it will lift pulleys 37, 37a and consequently rock the shaft 41 to raise the attached stop latches 108, 108a and thereby release the said star wheels that will now rotate ninety degrees counter-clockwise on the shaft 31 by the urge of the moving product and until the next following blades of the star wheels are engaged by the said latches 108, 108a and temporarily brought to a stop.

At the stopping of the star wheels, the first product has arrived at a position "P1" and resting against the star wheel arms 107b that permit it to square or align itself across the machine, but maintains it out of firm engagement with drum 13 and belts 19, 19a until the following product "P" approaches from the right (Fig. 6). This last-mentioned product releases the latches 108, 108a again in the manner above-described and permits the star wheels to make another 90 degree turn and thereby deposit product "P1" between the drum 13 and the belts 19, 19a. In this manner, a product "P" will be engaged and firmly held by the belts 19, 19a in a predetermined square position and at a definite spacing, one from the other, that will vary only with the frequency at which the ducts arrive into the machine.

It will be understood that the star wheels are timed in their rotation by the arrival of the products "P" so that the machine, as a whole, does not require to be actuated by a prime mover or master source, and does not require the use of intricate or elaborate electronic timing mechanism.

Since the belts 19, 19a exert comparatively strong pressure, each product "P" will be firmly retained against the cutting surfaces 13b of pulleys 13, 13a so that the rotary saw 57 will be effective to cut the products in half, and the rotary cutters 80, 80a will subsequently trim the sawed edges of the previously cut products.

It is to be further noted that the rotation of the saw 57 is comparatively rapid in order to obtain the best cutting effect, while the speed of the cutters 80, 80a is only slightly more than that of drum 13 and belts 19, 19a in order to produce the best action for providing a clean cut edge of the product "P" after its previously sawing.

As the abrasive action of the paper products tends to dull the edges of the cutters 80, 80a, it will be understood that the continuous sharpening effected by the stones 86, 86a oscillating under tension across the cutting edges of the said cutters, will tend to uninterruptedly restore the said cutting edges to a sharp condition.

The chips emanating from the products while being operated upon, are caught in a guard member 109 which, as seen in Figure 1, completely encircles the saw 57 and the cutters 80, 80a. The trapped chips fall to the bottom portion of the guard 109 from whence they may be removed through an opening, as at 110, by any suitable means (not shown).

The finished or severed products, it is to be understood, emanate from the conveyor "D" at the left hand side of the drum 13 (Figure 1). The conveyor "D" therefore serves as the delivery conveyor for the machine from which the products issue in a continuous stream while the device is operating.

It is to be understood that the invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

What I claim is:

1. In a device of the kind described, a frame, a conveyor assembly arranged on the frame, said conveyor assembly being constructed and adapted to receive and forward paper products, a shaft rotatably supported on the conveyor and having a plurality of rotary stops, gear means integrally formed with said rotary stops, a plurality of pulleys secured to said shaft, a second shaft carried by the plurality of pulleys and eccentrically positioned thereon, said second shaft having gear means fastened thereto and cooperably engaged with the first-mentioned gear means, both of said gear means serving to maintain said rotary stops in predetermined angular relation to each other, a plurality of latches hingedly connected to the conveyor and engageable with said rotary stops, and other means arranged on the conveyor and effective to release the latches from the rotary stops when said other means are operated by a product being forwarded by the said conveyor.

2. In a device of the kind described, a frame, a conveyor assembly arranged on the frame, said conveyor assembly being constructed and adapted to receive and forward a paper product, a shaft rotatably supported on the conveyor and having a plurality of rotary stops, said stops being engageable by a paper product being forwarded by the conveyor, a rock shaft rotatably mounted on the frame, a plurality of latches fastened to the rock shaft and in cooperable relation with said rotary stops, a plurality of pulleys mechanically secured to the rock shaft, and a plurality of belts operatively engaged with said pulleys and forming a part of the conveyor assembly; whereby when the belts and consequently the pulleys are angularly moved by a paper product being conveyed by said belts, said rock shaft will be rocked and the latches will be raised to thereby release said rotary stops.

3. In a device of the kind described, in combination, a frame, a conveyor arranged on the frame and having a construction adapted to receive and forward paper products, a plurality of star wheels associated with the conveyor and effective to register said paper products, one at a time, into a predetermined position, an axis member mounted on the frame and whereon said star wheels are freely rotatable, a rock shaft rotatably mounted on the frame, latches fast to the rock shaft and operably engageable with the star wheels, and means associated with the rock shaft and operable by a product being forwarded by the conveyor; whereby said product will initially engage said means to rock the rock shaft to raise and thereby release said latches from the star wheels, and then will thrust registeringly against the star wheels to angularly move them and permit a following product to be forwarded by the conveyor.

4. In a device of the kind described, in combination, a frame, a conveyor arranged on the frame and having a construction adapted to receive and forward paper products, a plurality of star wheels associated with the conveyor and effective to register said paper products, one at a time, into a predetermined position, an axis member mounted on the frame and whereon said star wheels are freely rotatable, gear means arranged on the conveyor and connected to the star wheels, said gear means operatively maintaining said star wheels in predetermined angular registration, a rock shaft rotatably mounted on the frame, latches fast to the rock shaft and operably engageable with the star wheels, and means associated with the rock shaft and operable by a product forwarded by the conveyor; whereby said product will initially engage the means to rock the rock shaft to raise and thereby release said latches from the star wheels, and then will thrust registeringly against the star wheels to angularly move them and permit a following product to be forwarded by the conveyor.

References Cited in the file of this patent

UNITED STATES PATENTS

| Number | Name | Date |
|---|---|---|
| 175,458 | Heyl | Mar. 28, 1876 |
| 260,779 | Perkins | July 11, 1882 |
| 908,332 | Rust | Dec. 29, 1908 |
| 1,177,146 | Sheehan | Mar. 28, 1916 |
| 1,585,238 | Dreher | May 18, 1926 |
| 1,805,735 | Kurtz | May 19, 1931 |
| 1,820,680 | Scher | Aug. 25, 1931 |
| 1,898,005 | Diescher | Feb. 21, 1933 |
| 1,908,845 | Hopkins | May 16, 1933 |
| 2,035,563 | Molins | Mar. 31, 1936 |
| 2,039,831 | Page | May 5, 1936 |
| 2,211,765 | Davidson | Aug. 20, 1945 |
| 2,428,769 | Bobst | Oct. 14, 1947 |
| 2,609,049 | Rayburn | Sept. 2, 1952 |
| 2,620,033 | Wood | Dec. 2, 1952 |